(12) United States Patent
Dey

(10) Patent No.: US 9,529,811 B2
(45) Date of Patent: Dec. 27, 2016

(54) SYSTEM AND METHOD FOR MANIPULATING DATA RECORDS

(71) Applicant: Melvin Lawerence Dey, Ottawa (CA)

(72) Inventor: Melvin Lawerence Dey, Ottawa (CA)

( * ) Notice: Subject to any disclaimer, the term of this patent is extended or adjusted under 35 U.S.C. 154(b) by 492 days.

(21) Appl. No.: 14/083,064

(22) Filed: Nov. 18, 2013

(65) Prior Publication Data

US 2014/0143210 A1 May 22, 2014

Related U.S. Application Data

(60) Provisional application No. 61/727,878, filed on Nov. 19, 2012.

(51) Int. Cl.
*G06F 17/30* (2006.01)

(52) U.S. Cl.
CPC ....... *G06F 17/301* (2013.01); *G06F 17/30115* (2013.01); *G06F 17/30292* (2013.01)

(58) Field of Classification Search
USPC .................................................. 707/687, 809
See application file for complete search history.

(56) References Cited

U.S. PATENT DOCUMENTS

| | | | | |
|---|---|---|---|---|
| 5,282,058 A | * | 1/1994 | Tsuboi | H04N 1/233 358/449 |
| 5,418,965 A | * | 5/1995 | Mahar | G06F 17/30289 707/999.2 |
| 5,719,985 A | * | 2/1998 | Ito | G11B 20/00007 348/E7.073 |
| 5,764,518 A | * | 6/1998 | Collins | B25J 9/1617 700/117 |
| 7,496,572 B2 | * | 2/2009 | Blaicher | G06F 17/30339 |
| 2010/0160759 A1 | * | 6/2010 | Celentano | A61B 5/14532 600/365 |
| 2010/0302919 A1 | * | 12/2010 | Ling | G11B 20/10527 369/30.23 |
| 2014/0039666 A1 | * | 2/2014 | Kim | B23Q 5/56 700/174 |
| 2014/0143210 A1 | * | 5/2014 | Dey | G06F 17/30115 707/687 |

* cited by examiner

*Primary Examiner* — Kim Nguyen
(74) *Attorney, Agent, or Firm* — Stetina Brunda Garred and Brucker

(57) ABSTRACT

Systems and methods for manipulating data records in a byte accessible format are provided. Records may be loaded into one of two byte accessible files or arrays, with a determined record length added to the beginning and/or end of each record. Records may then be slewed between the two files and records added, removed, or modified at the split between the two files.

18 Claims, 15 Drawing Sheets

SYSTEM AND METHOD FOR MANIPULATING DATA RECORDS

CROSS-REFERENCE TO RELATED APPLICATIONS

The present non-provisional patent application claims priority to U.S. Provisional Patent Application No. 61/727,878 filed on Nov. 19, 2012 entitled "System And Method For Manipulating Data Records" the contents of which are incorporated herein by reference.

TECHNICAL FIELD

The current description relates to a system and method for manipulating data records and in particular to a system and method for interfacing with databases and manipulating records of the database.

BACKGROUND

Databases store information in a number of tables, records and fields. The information stored in a database may be accessed and manipulated in various ways. When accessing the information stored in a database, it may be temporarily stored in an associated data structure that provides convenient access to, and manipulation of, the individual records and/or fields. For example a record of a database may be retrieved an stored in a corresponding instance of an object that has members for each field of the record.

While storing data records, or portions of data records, in a data structure such as an instance of an object may be convenient for manipulation of the data records, there may be situations in which it is necessary or desirable to manipulate data records that are stored in a byte-addressable format.

BRIEF DESCRIPTION OF THE DRAWINGS

These and other features, aspects and advantages of the present disclosure will become better understood with regard to the following description and accompanying drawings wherein.

DETAILED DESCRIPTION

Figure 1:
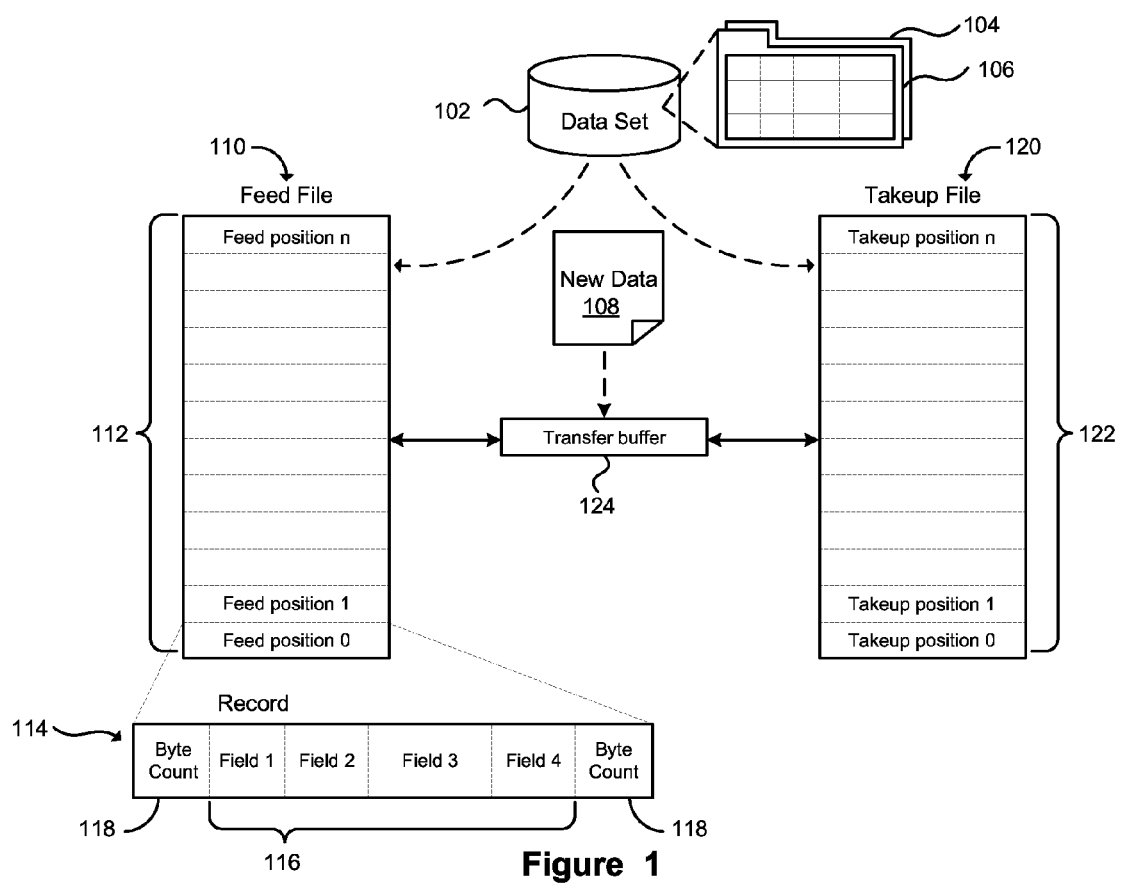
FIG. 1 depicts an overview of a record handling process.

In accordance with the present disclosure there is provided a method of manipulating data records comprising: reading a plurality of data records from a record source, for each of the plurality of data records: determining a length of the data record; and adding the data record and associated length to a first file at a first position; receiving a new data record to be added to the plurality of data records; determining a length of the new data record; slewing the data records between the first file and a second file until the new record should be added after a last feed record of the first file or before a last takeup record of the second file based on a comparison of values of the new data record and the data records being slewed between the first file and the second file; and adding the new record and associated length to either the end of the first file or the second file.

In at least one embodiment of the method, the record source is a database.

In at least one embodiment of the method, the method further comprises: retrieving the plurality of data records from the database; and storing the data records from the first file and second file to the database after the new data record has been added.

In at least one embodiment of the method, the method further comprises: modifying contents of one or more data records.

In at least one embodiment of the method, modifying contents of one or more data records comprises updating the associated length of the modified one or more data records.

In at least one embodiment of the method, slewing the data records comprises: moving a data record from the first file to a transfer buffer; comparing the new data record to the data record of the transfer buffer to determine if the new data record should be added between the record in the transfer buffer and the last record in the second file; if the new data record should be added between the data record in the transfer buffer and the last record in the second file, adding the new transfer record to the second file; and if the new data record should not be added between the data record in the transfer buffer and the last record in the second file, moving the data record from the transfer buffer to the second file and moving another data record from the first file to the transfer buffer.

In at least one embodiment of the method, slewing the data records further comprises: comparing a further new data record to be added to the data record of the transfer buffer to determine if the further new data record should be added between the record in the transfer buffer and the last record in the second file or between the record in the transfer buffer and the last record in the first file; if the further new data record should be added between the data record in the transfer buffer and the last record in the second file, adding the further new transfer record to the second file; and if the further new data record should be added between the data record in the transfer buffer and the last record in the first file, adding the further new transfer record to the first file; and if the further new data record should not be added between the data record in the transfer buffer and the last record in the second file or the last record in the first file: determining a slew direction for slewing the data records between the first file and the second file based on where the further new data record should be added; and slewing the data records between the first file and the second file in the determined slew direction.

In at least one embodiment of the method, if the slew direction indicates slewing data records from the first file to the second file, the further new data record may be added to the second file; and if the slew direction indicates slewing data records from the second file to the first file, the further new data record may be added to the first file.

In at least one embodiment of the method, the determined slew direction indicates whether the data records should be slewed from the first file to the second file or from the second file to the first file.

In at least one embodiment of the method, slewing the data records comprises: comparing the new data record to the last data record of the first file to determine if the new data record should be added between the last data record of the first file and the last record in the second file; if the new data record should be added between the last data record of the first file and the last record in the second file, adding the new transfer record to the second file; and if the new data record should not be added between the last data record of the first file and the last record in the second file, moving the last data record of the first file to the second file.

In at least one embodiment of the method, wherein the associated length is stored at the end of the respective data record.

In at least one embodiment of the method, the associated length is stored at the beginning of the respective data record.

In at least one embodiment of the method, the associated length is stored at the beginning and at the end of the respective data record.

In at least one embodiment of the method, each data record comprises a plurality of data fields.

In at least one embodiment of the method, the method further comprises using a sort sequence specifying an order of two or more of the plurality of data fields when determining where the new data record should be added between the plurality of data records.

In at least one embodiment of the method, the sort sequence defines a sort order as ascending or descending for each of the two or more data fields.

In at least one embodiment of the method, the data records are grouped into a plurality of segments.

In at least one embodiment of the method, the method further comprises slewing segments of data records between the first file and the second file.

In accordance with the present disclosure there is further provided a system for manipulating data records comprising: a processor for executing instructions; and a memory for storing instruction, which when executed by the processor configure the system to: read a plurality of data records from a record source, and for each of the plurality of data records: determine a length of the data record; and add the data record and associated length to a first file at a first position; receive a new data record to be added to the plurality of data records; determine a length of the new data record; slew the data records between the first file and a second file until the new record should be added after a last feed record of the first file or before a last takeup record of the second file based on a comparison of values of the new data record and the data records being slewed between the first file and the second file; and add the new record and associated length to either the end of the first file or the second file.

In accordance with the present disclosure there is further provided a non-transitory computer readable memory storing instruction, which when executed by a processor of a computing system configure the computing system to: read a plurality of data records from a record source, and for each of the plurality of data records: determine a length of the data record; and add the data record and associated length to a first file at a first position; receive a new data record to be added to the plurality of data records; determine a length of the new data record; slew the data records between the first file and a second file until the new record should be added after a last feed record of the first file or before a last takeup record of the second file based on a comparison of values of the new data record and the data records being slewed between the first file and the second file; and add the new record and associated length to either the end of the first file or the second file.

A record handler system is described further herein that may interface with existing databases and enable sorting, or other record manipulations, to be carried out in a simple, straightforward manner. The record handler loads records into two byte-accessible files or arrays with a transfer record buffer between the two files or arrays. This allows database files of records to be segmented for different logical operations, which may reduce difficulties associated with modifying the records. By segmenting, or splitting the records between the two files, the files can be slewed up and down and new records may be inserted into the either file at the location of the split. The transfer record buffer may be used to temporarily store a record as it is transferred from one file to another during the slewing of the files. During the process of slewing records between the files, a record that is in the transfer record buffer may be modified before transferring to one of the record files. As described in further detail herein, the record handler allows manipulation of records while they are stored in a byte-addressable format. The manipulation may include adding, deleting, moving and/or modifying records.

FIG. 1 depicts an overview of a record handling process. As can be seen from FIG. 1, a data set 102, which may be for example a database, stores a number of data records. The data records are depicted as being stored in a number of tables 104, 106, which each may store data records having various fields of information. Although depicted as being stored in tables 104, 106, it will be appreciated that the physical storage of the data records in non-volatile storage may be stored in various folders and files. For example, a single table may be stored as a file with individual records and fields stored in the file. As will be described in further detail herein, the individual data records stored in the data set 102, or a subset of the data records, may be loaded into a feed file 110 or a takeup filed 120. New data 108, which may be a new data record that is to be added to the data set 102, may be received from one or more external sources.

Individual records are added to the feed file 110, or the takeup file 120. As depicted, the feed file 110 has a number of feed positions 0, 1 . . . n which may store a record. Each individual record, depicted as record 114, stored in the feed file 110 or takeup file 120 may comprise a number of fields 114 of data. The individual fields within a record may be identified in various ways. If all fields are of a fixed size, the size may be specified and used to identify individual fields within records. For example, for Record 114 all fields may be of a known fixed length, and as such, field 1 may always be located at bytes 0 . . . 2, field 2 may always be located at bytes 3 . . . 7, field 3 may always be located at bytes 8 . . . 14 and field 4 may always be located at bytes 15 . . . 17. In this example, the byte count 118 for the entire record may be 18 bytes. Alternatively, the size of the fields may not be the same for each record. In such a scenario, the size of the field must be specified for each field. Accordingly, Record 114 may include a byte count for the field size at the beginning, and/or, end of each field. The byte size used to specify the field size for each field may be fixed, for example as one byte. For example, field 1 of record 114 may be prefixed with a byte indicating that the field is 3 bytes long, field 2 may be prefixed with a byte indicating that the field is 4 bytes long, field 3 may be prefixed with a byte indicating that the field is 6 bytes long and field 4 may be prefixed with a byte indicating that the field is 2 bytes long. In the variable-length field example, the byte count of the record 114 will vary depending upon the actual length of the fields. Additionally, the byte count of the record length may include the field lengths if included. For example, the byte count 118 for the above noted example of the variable length field may be 22 bytes, which is the sum of the 18 bytes of the field data plus the 4 individual bytes specifying the field length.

Since the feed file 110 and takeup file 120 are byte-accessible data, such as a file or memory array, in order to be able to identify the individual records each individual record is associated with a byte count 118. The byte count may be located at the beginning and/or the end of the record. Further, the byte count may include the additional bytes for storing the byte count or these may be known and added to the byte count in order to move to the next record in the byte accessible files.

The feed file 110 and the takeup file 120 each are byte-accessible data, such as a file or a block in memory, capable of storing the plurality of data records 112, 122 respectively. Although in FIG. 1, the feed file 110 and takeup file 120 diagrammatically depict records stored in each position 0, 1 . . . n as being the same size, it will be appreciated that, as described above, the size of individual records may be varied, although a byte count indicative of the record size must be associated with each record.

Data records may be added to the feed file 110 or the takeup file 120. When adding records to either the feed file 110 or the takeup file 120, the record length may be determined and associated with the record, for example by storing the byte count at the beginning and/or end of the record. Records in the byte accessible feed file and takeup file 110, 120 may be slewed between each file. Slewing the records between the two files provides a convenient split in the records at which new records can be conveniently inserted. The slewing of records may move a record from the end of one file, for example the feed file, to the other file, for example the takeup file. The slewing of the records may be done through a transfer buffer, in which case a record is move from the transfer buffer, if a record is present, to for example the takeup file, and then a record is moved from the feed file to the transfer buffer. This process may be repeated to slew records from the feed file to the takeup file. Similarly, records may be moved from the takeup file to the record buffer and then to the feed file in order to slew files from the takeup file to the feed file.

It is considered, although not necessary, that the records added to the feed file 110 or the takeup file 110, 120 are added in a sorted order. The records may be sorted in various ways using one or more of the fields and may be retrieved from the data set in a sorted order or may be retrieved from the data set in an unsorted order and sorted as the records are added. As described above, when records are slewed between the feed file and the takeup file, they may be temporarily stored in a transfer buffer 124. The transfer buffer 124 provides a convenient location to hold a record, which may be compared to a new data record 108 to determine a location the new data record should be inserted at, as well as to provide a convenient location for modifying or deleting existing records.

Using the feed file 110 and takeup file 120 described above enables a stream of data records, which may have varying individual byte lengths, to be split. The split in the records may be slid up and down by slewing the records between the feed file and the takeup file. New records may be easily inserted between records at the split.

Figure 2:
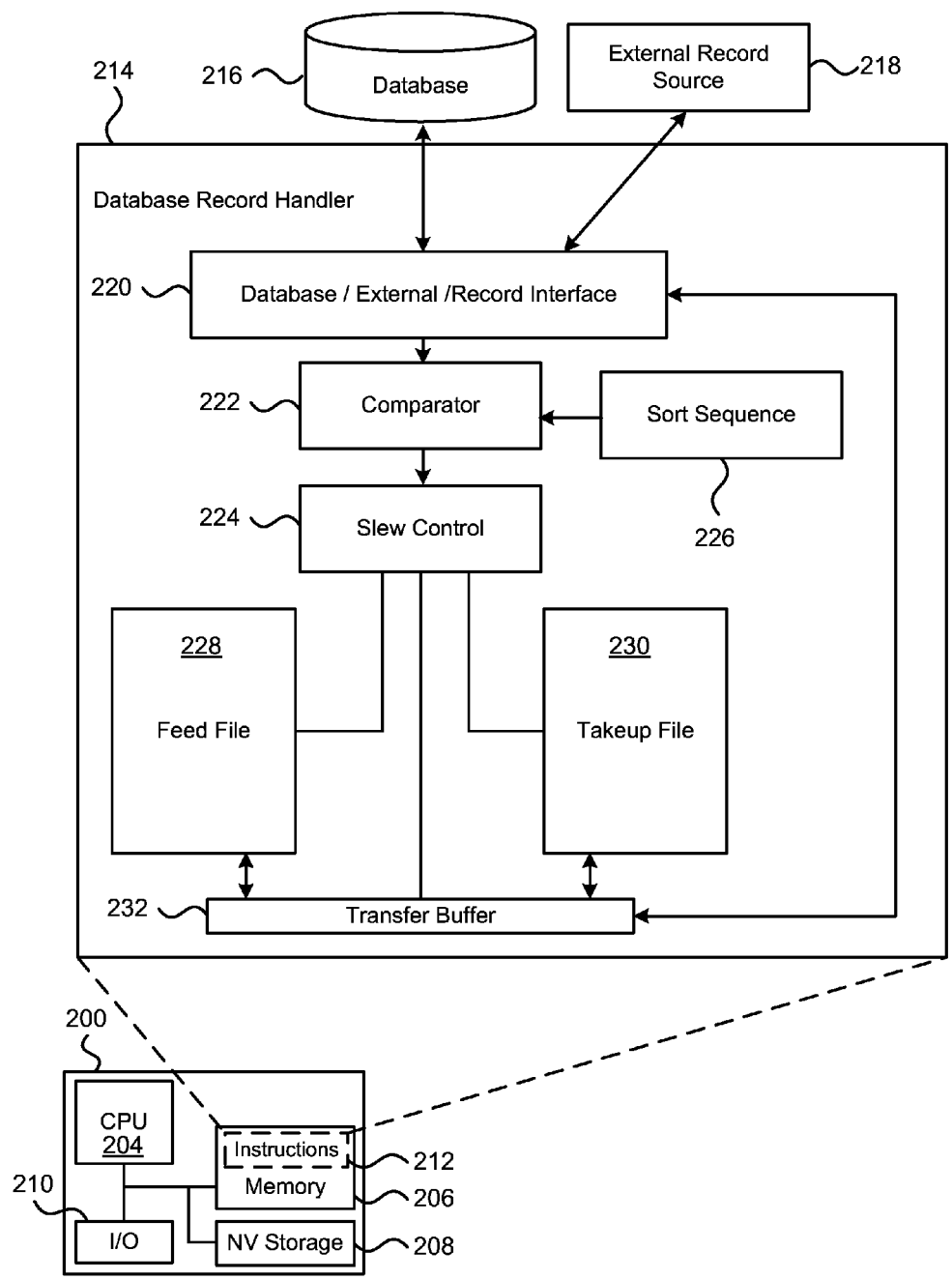
FIG. 2 depicts components of a record handler.

FIG. 2 depicts components of a record handler that may be used to provide the process described above with regard to FIG. 1. As depicted, the record handler may be implemented on a computer system 200 that comprises a central processing unit (CPU) 204 and a memory unit 206. The computer system 200 may further comprise non-volatile storage 208 as well as an input/output interface 210. The CPU 204 may execute instructions 212 stored in the memory 206. When the instructions 212 are executed by the CPU 204, the computer system 200 is configured to provide a database record handler 214.

The record handler 214 may receive records from a database 216 as well as an external record source 218. The record handler 214 may comprise a record interface 220 for receiving records from the database 216 or external source 218 as well as from a transfer buffer 232. The record interface 220 may also write records to the database 216, external source 218 as well as the transfer buffer 232. The record interface 220 may receive records for inserting into the plurality of records in the feed and takeup files. When the record interface 220 receives a record for insertion, the byte length of the record may be determined and added to the beginning and/or end of the record. By associating the length at the beginning and/or end of the record, the slew control may easily determine the location of the next or previous records within the feed and takeup files 228, 230. The record interface 220 may provide records, or individual fields of records, to a comparator 222. The comparator may compare records to each other in order to determine a sort order of the records when determining where the record should be inserted into the feed file 228 and takeup file 230. The comparator 222 may utilize a sort sequence 226 to determine where a record should be inserted. The sort sequence 226 may provide an indication of an order of fields of the records for searching. The sort sequence 226 may also indicate a direction that each of the fields should be ordered in. For example, the sort sequence 226 may indicate that the records should be sorted by the first field in ascending order, then by the third field in ascending order and finally by the second field in descending order. The comparator 222 may provide the result of the comparison of the records to a slew control 224 that controls the slewing of the records between the feed file 228 and the takeup file 230, through the transfer buffer 232. Based on the result of a comparison, the records may be slewed between the feed and takeup files and records inserted into the feed file, takeup file or transfer buffer. The slew control 224 may maintain indications of where in the feed file 228 and the takeup file 230 records are being read from or written to. The record handler 214 can receive records, insert the records into the feed and takeup file in a sorted order, as well remove or modify the records in the feed and takeup files by slewing the records between the files.

FIGS. 3A-3G depict a process of slewing records between two files. As described above, records may be added to a feed file 310 or takeup file 320. The records may be slewed between the two files by moving a record from one file to the other file through a transfer buffer. As described further with reference to FIGS. 3A-3G, a number of records are loaded into the feed file and then all of the records are slewed over to the takeup file.

Figure 3A:
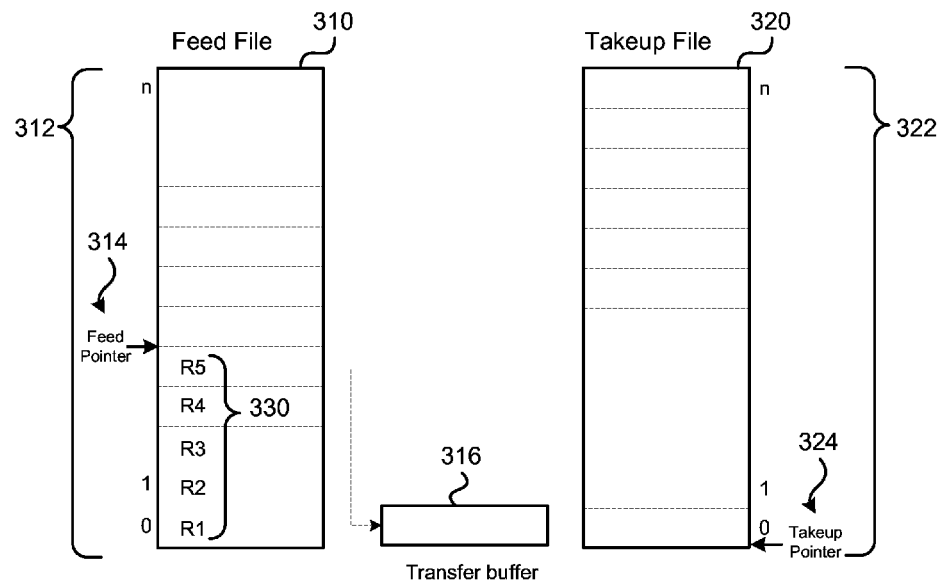
FIGS. 3A-3G depict a process of slewing records between two files.

As can be seen in FIG. 3A a number of records 300 (R1-R5) are loaded into the feed file 310. The feed file 310 comprises a number of positions 312 in which the records may be written. As depicted in FIGS. 3A-3G, each of the feed file 310 and takeup file 320 write records to the file in the same direction. That is, both the feed file and the takeup file write records starting at the bottom of the file and adding records upwards. A feed pointer 314 indicates where in the feed file records should be written to. A record length can be associated with the beginning of each record, so that the length of the record can be easily determined and the record read from the feed file.

Figure 3B:
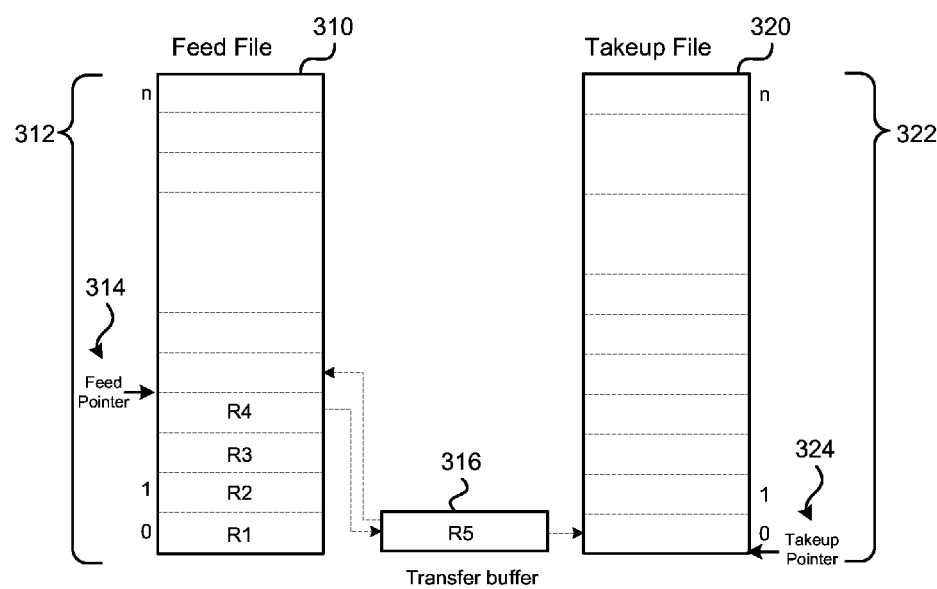
Figure 3C:
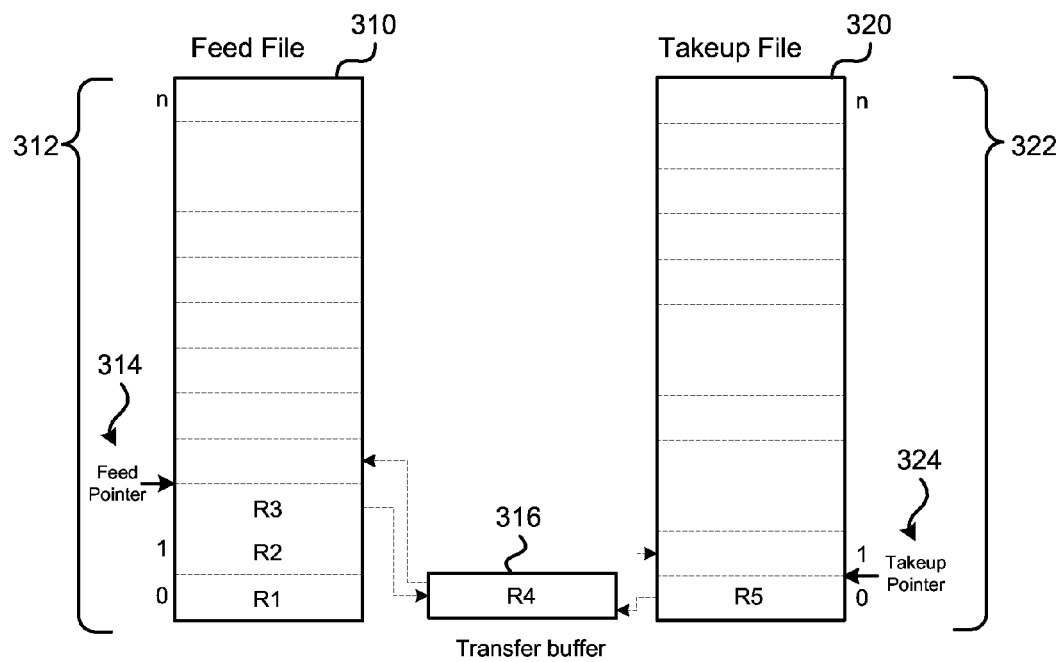

The length of the record R5 may be determined using the byte length of the record associated with the start or end of the record. Once the length of the record is determined it can be read from the feed file into the transfer buffer 316 and the feed pointer updated to point to the location of the next record of the feed file 310 as shown in FIG. 3B. To continue slewing files from the feed file, the record R5 is moved from the transfer buffer 316 to the takeup file 320. As described above, the takeup file 320 has a number of positions 322 that records can be written to. When the record R5 is written to the takeup file 320 a takeup pointer 324 can be updated to point to the beginning of the record R5 as shown in FIG. 3C.

Figure 3D:
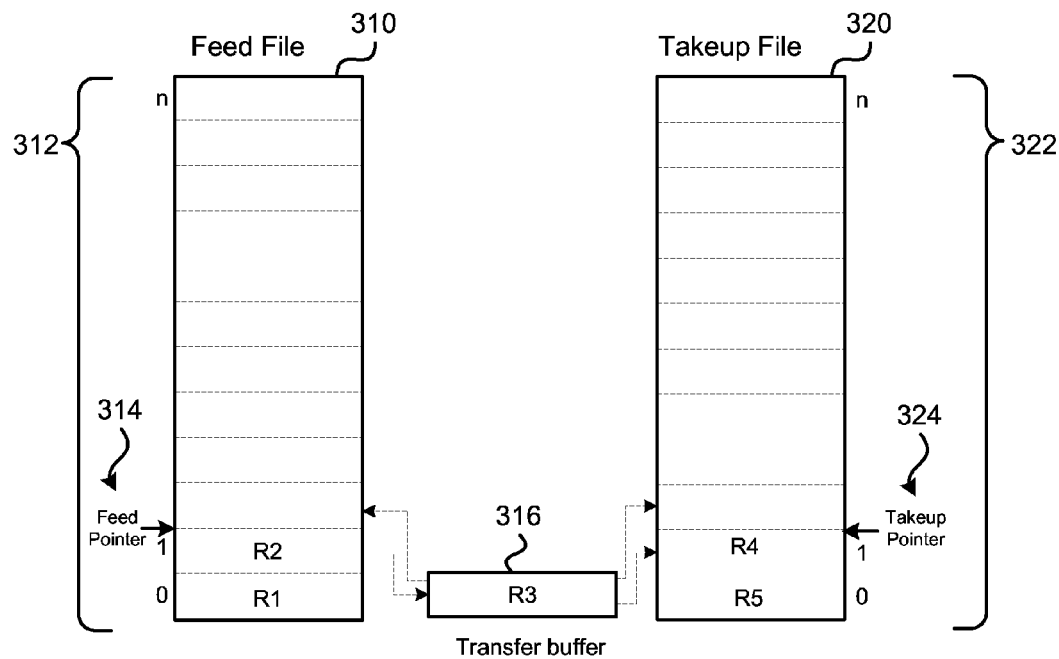
Figure 3E:
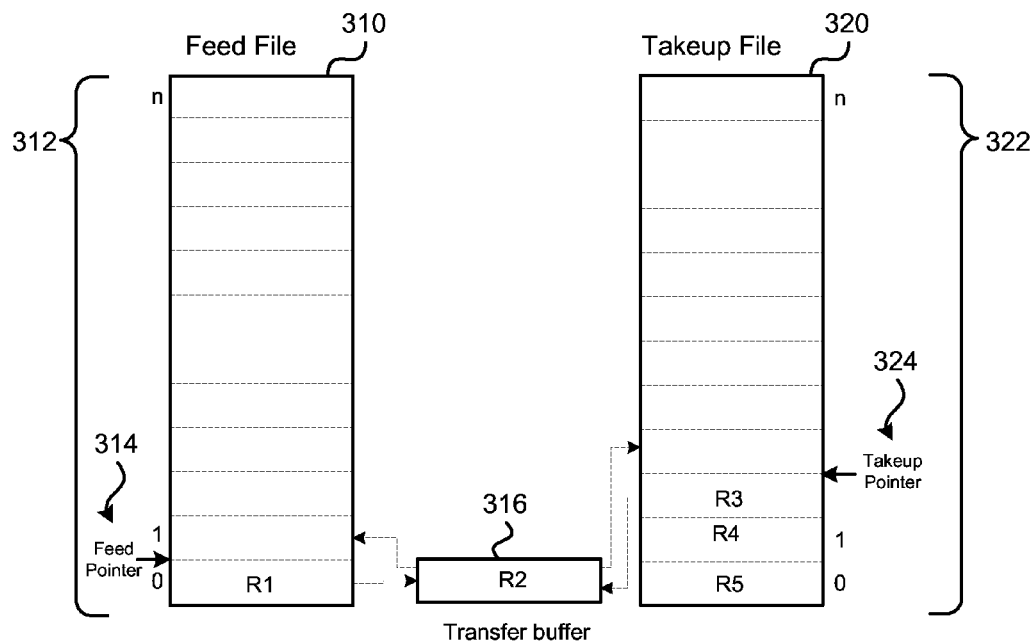
Figure 3F:
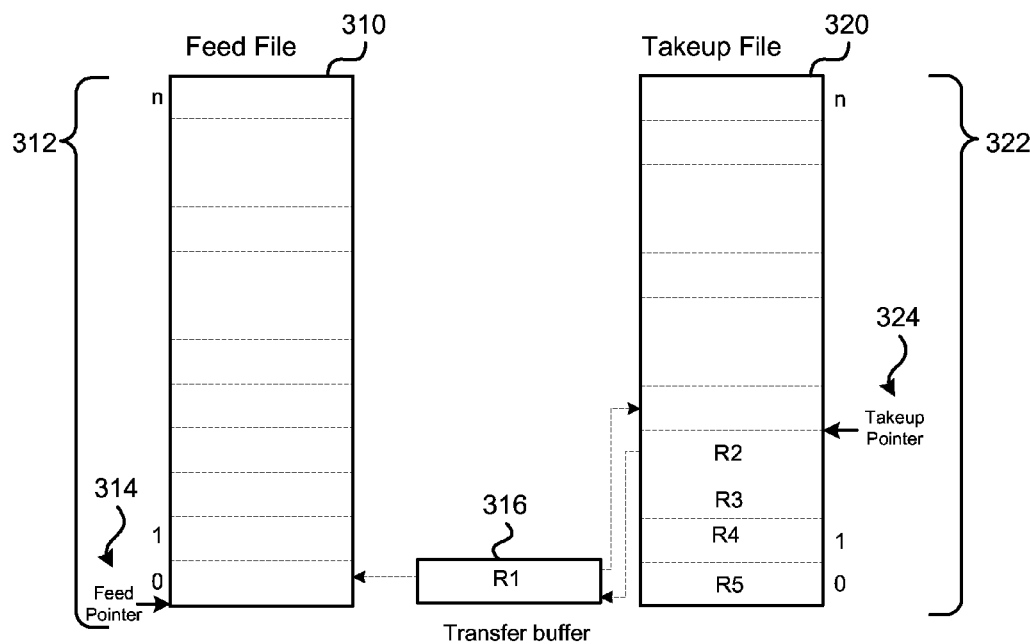
Figure 3G:
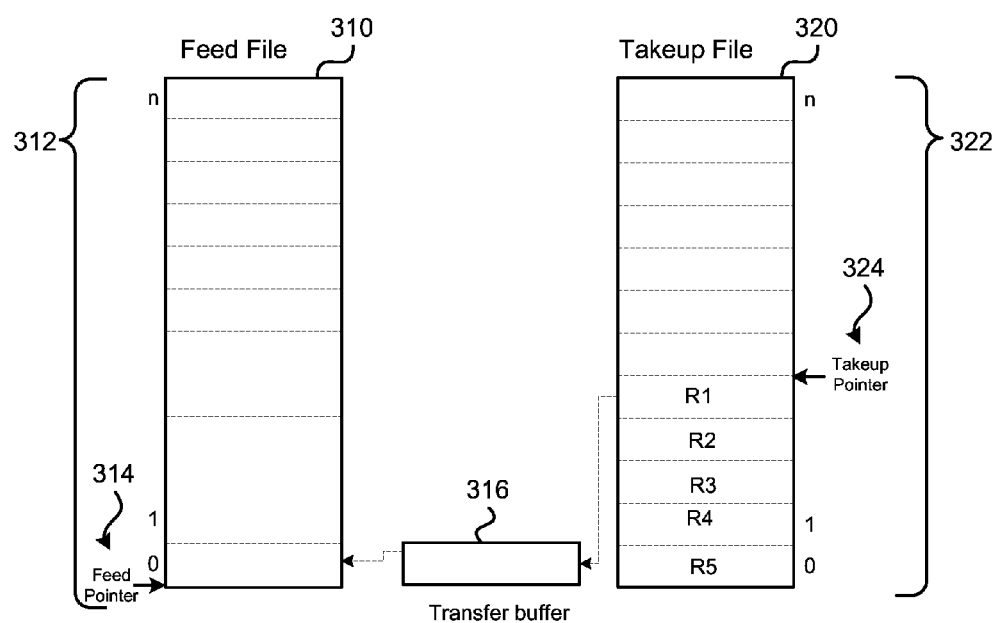

The records continue to be slewed from the feed file 310 to the takeup file 320. The record R4 is moved from the transfer buffer 316 to the takeup file 320, and the takeup pointer 324 is updated. Once the record R4 is moved from the transfer buffer 316, another record R3 is moved from the feed file to the transfer buffer and the feed pointer updated as shown in FIG. 3D. The slewing of records continues, with moving the record R3 from the transfer buffer to the takeup file 320 and updating the takeup pointer 324. Another record R2 is moved from the feed file to the transfer buffer and the feed pointer updated. The record R2 is then moved from the transfer buffer to the takeup file and the record R1 moved from the feed file to the transfer buffer 316. The takeup pointer 324 and the feed pointer 314 are updated as shown in FIG. 3F. Finally, the record R1 is moved from the transfer buffer to the takeup file 320 so that all of the records are located in the takeup file, although in reverse order than in the feed file.

FIGS. 4A-4H depict a process of adding records. FIGS. 3A-3G depicted slewing records from the feed file 310 to the takeup file 320. As described further below, records can be slewed between the feed file and the takeup file, as the records are slewed back and forth between the files, new records can be inserted into either the feed file, the takeup file or the transfer buffer in order to insert records into the files in a sorted order.

Figure 4A:
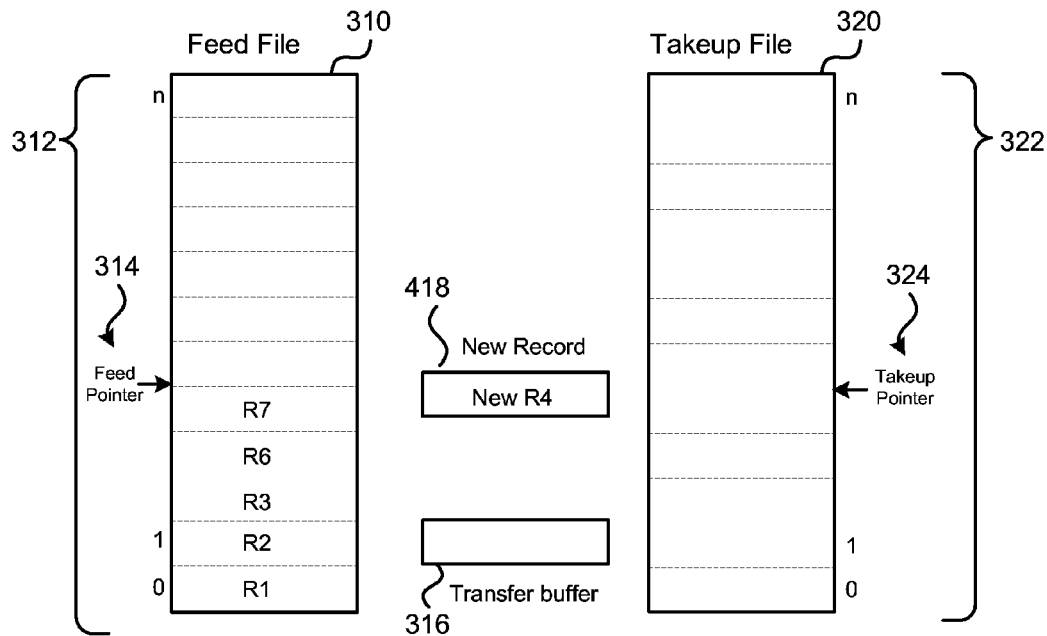
FIGS. 4A-4H depict a process of adding records.
Figure 4B:
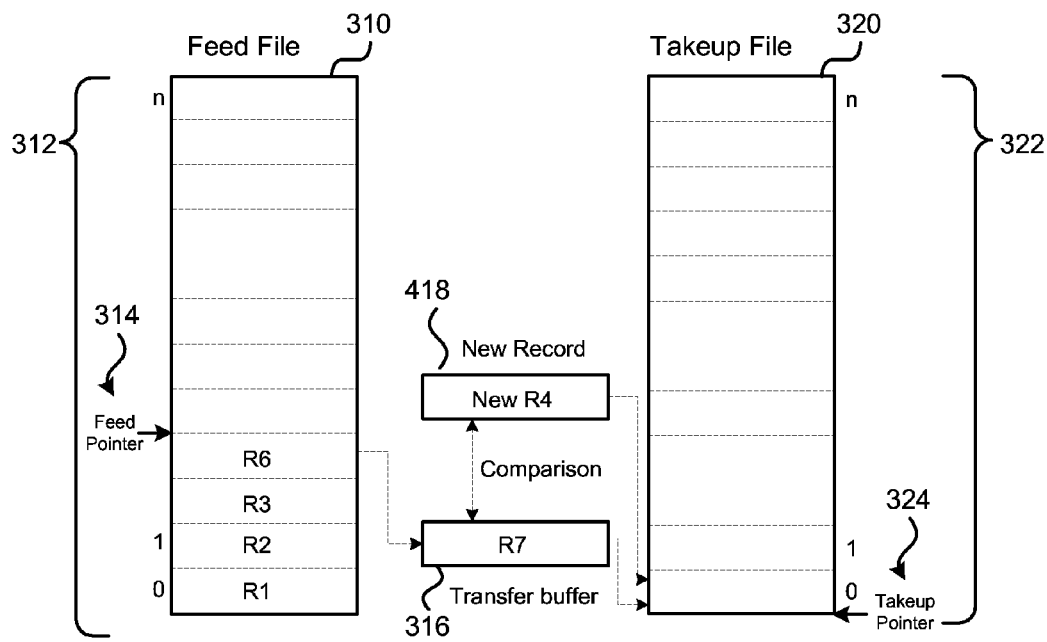
Figure 4C:
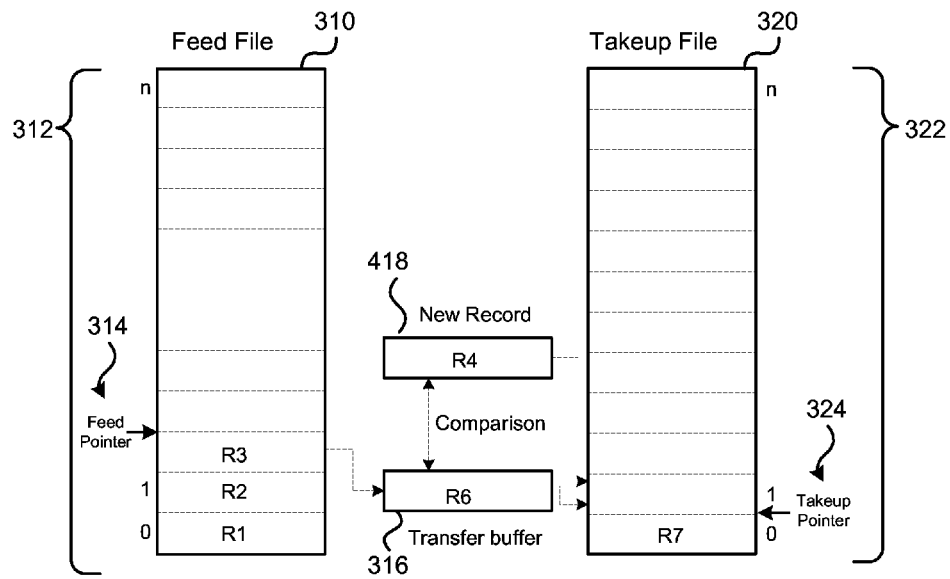
Figure 4D:
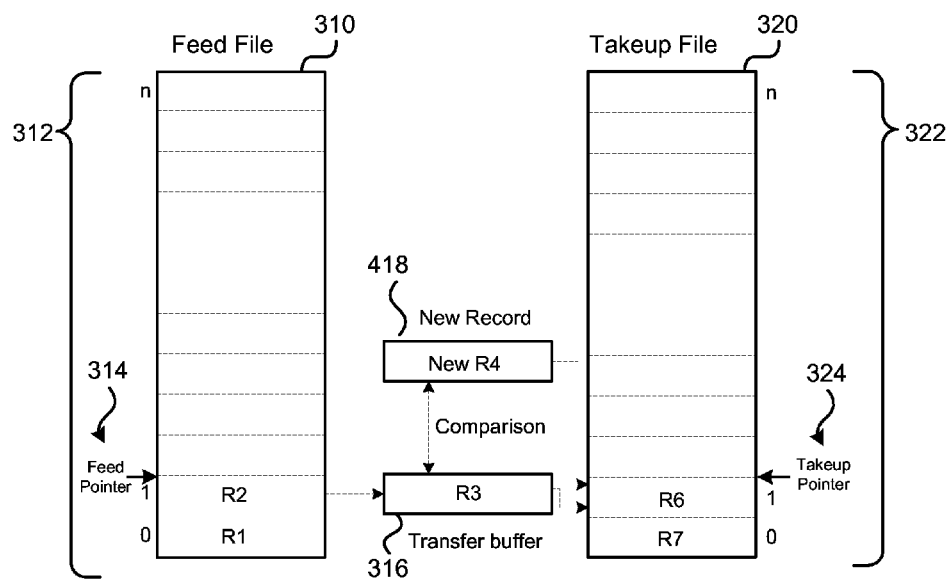

As shown in FIG. 4A, a number of records R1-R3, R6, R7 are loaded into the feed file 310. A new record New R4 to be added 418 should be inserted between records R3 and R6. In order to insert the new record 418 into the proper location, the records are slewed and the new record is compared to the record in the transfer buffer. A record R7 is moved from the feed file to the transfer buffer and compared to the new record, New R4, to be added as shown in FIG. 4B. The comparison determines that the record to be added, New R4, should be added after the record in the transfer buffer R7. The record R7 is moved from the transfer buffer to the takeup file and another record R6 moved from the feed file to the transfer buffer. Again the record in the transfer buffer is compared to the new record, New R4, as shown in FIG. 4C. The comparison of the records indicates that the record R6 should be added to the takeup file before the new record, New R4. The record R6 is moved from the transfer buffer to the takeup file and another record moved from the feed file to the transfer buffer. Again another comparison is made between the record in the transfer buffer and the new record as shown in FIG. 4D.

Figure 4E:
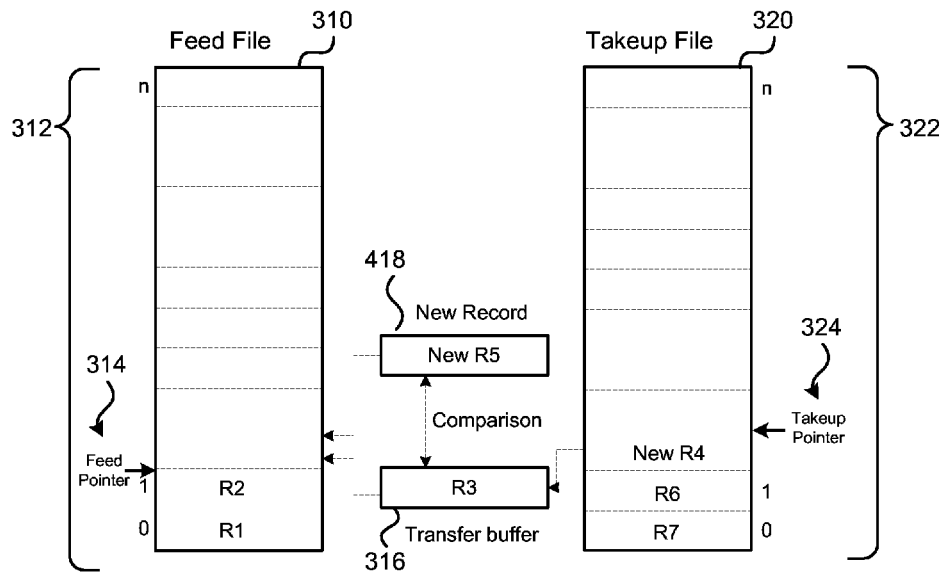
Figure 4F:
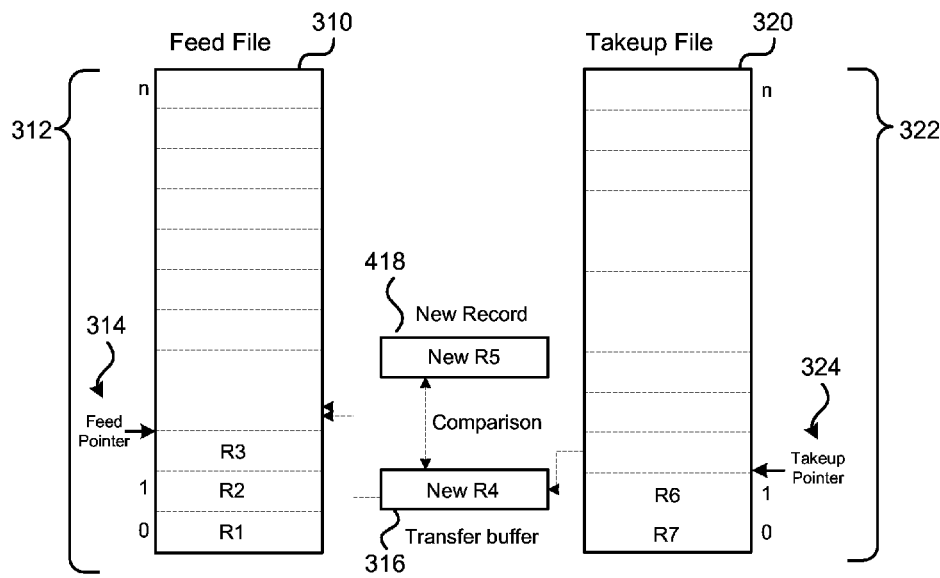
Figure 4G:
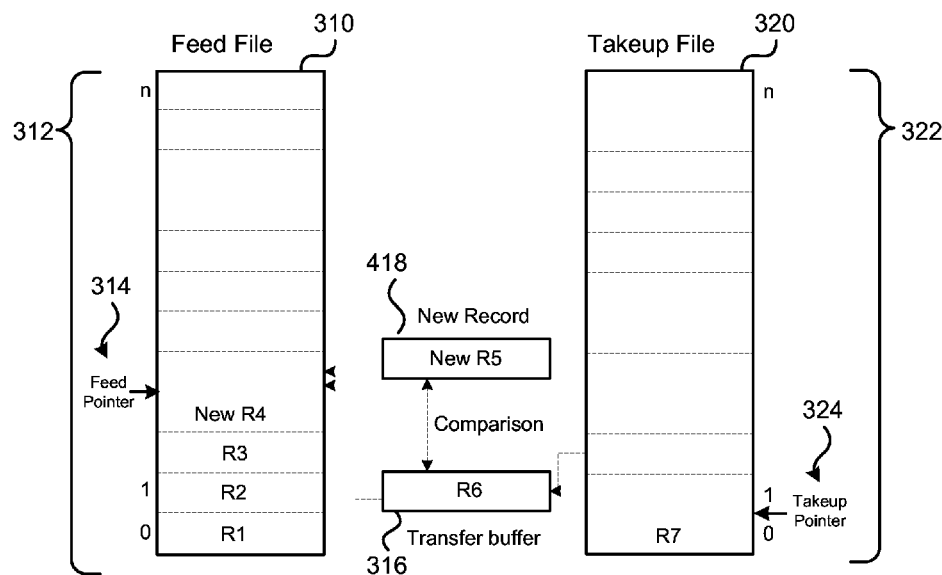
Figure 4H:
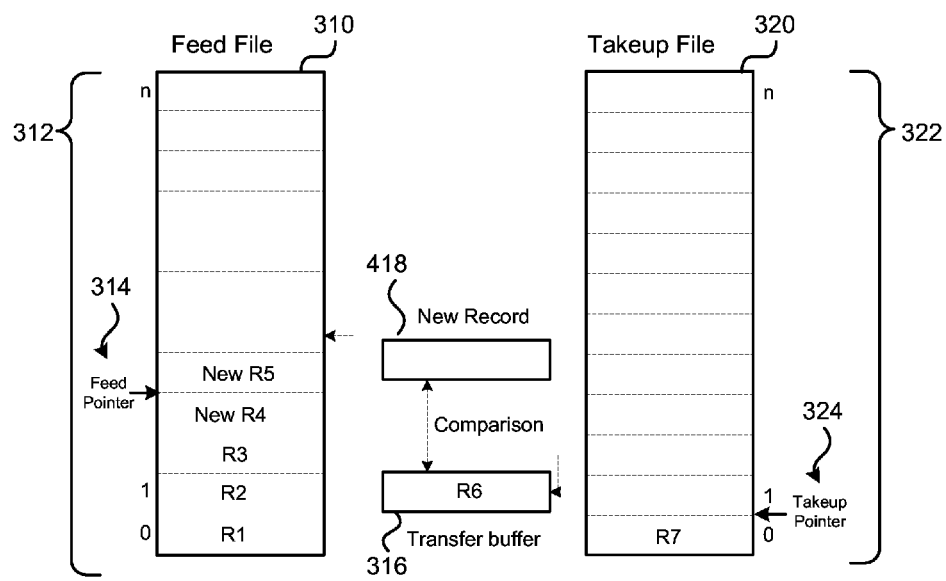

The comparison indicates that the new record, New R4, to be added should be added between the record R6 in the takeup file and the record R3 in the transfer buffer. The record, New R4, is added to the takeup file and another new record, New R5, is retrieved. The new record, New R5, is compared to the record in the transfer buffer, as shown in FIG. 4E. The comparison indicates that the new record, New R5, should be added after the record in the transfer buffer. Accordingly, the record R3 is moved from the transfer buffer to the feed file and another record, New R4, moved to the transfer buffer from the takeup file. The new record, New R5, is again compared to the record in the transfer buffer as shown in FIG. 4F. The comparison indicates that the new record, New R5, should be added after the record in the transfer buffer. As such, the record, New R4, is moved from the transfer buffer to the feed file and another record R6 moved from the takeup file to the transfer buffer. The record R6 is compared to the new record, New R5, as shown in FIG. 4G. The comparison indicates that the new record should be added before the record R6 in the transfer buffer and as such the new record, New R5, is added to the feed file.

As described above, records can be loaded into a feed file and slewed back and forth between the feed file and the takeup file. New records can be inserted by slewing records between the feed file and the takeup file until the new record should be inserted between the records that are split between the feed file and takeup file. As will be appreciated, determining where a record should be inserted may be based on a comparison between one or more fields of the records.

Figure 5:
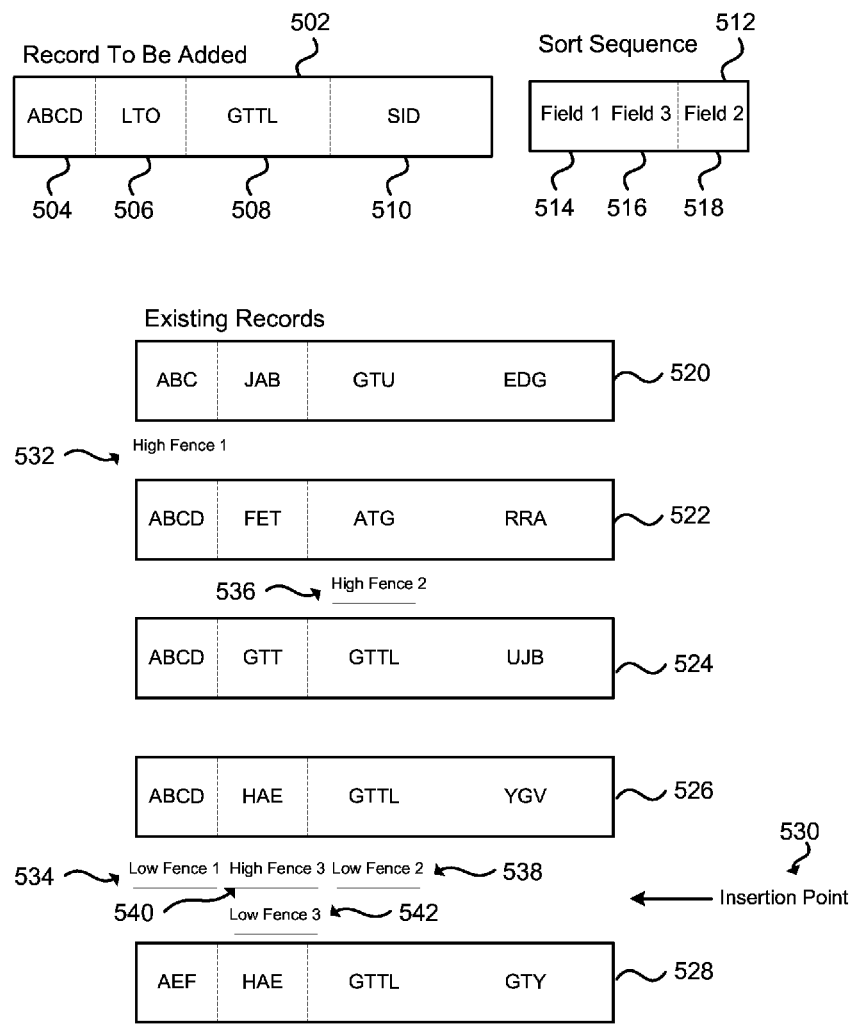
FIG. 5 depicts a process of determining an insertion point of a record.

FIG. 5 depicts a process of determining an insertion point of a record. As depicted a record to be added 502 comprises a number of fields 504, 506, 508, 510. A sort sequence 512 defines how the records are sorted. As depicted, the sort sequence defines three fields 514, 516, 518 that will be sorted. As depicted, the sort sequence indicates that Field 1 will be sorted first, followed by Field 3 and finally Field 2.

As depicted in FIG. 5, a number of existing records 520, 522, 524, 526, 528 are sorted and the new record should be inserted at the insertion point 530. The sorting may be done in various ways. As depicted, the records may be sorted alphabetically. When sorting the records, the records may be located in the feed file or the takeup file and slewed between the two files. As records are slewed up and down and compared in accordance with the sort sequence, markers 532, 534 can be set to indicate which records are above and which are below the field value being sorted. As depicted, additional markers 536, 538 can be set for the other fields to be sorted. It is only necessary to search through the records between the markers. Finally, a record is inserted at the position where a marker 540 indicating that the records above are too high and a marker 542 indicating that the records below are too low are located between the same record. One or more of the markers 532, 534, 536, 538, 540, 542 may be associated with the field values of the recording being inserted. Accordingly, if a subsequent record being inserted has the same field values, the existing markers can be reused. It should be appreciated that if the primary field values, with regard to the sort sequence, of a subsequently inserted recorded do not match the field values of the previously inserted record the markers associated with the secondary field values. That is, if for example, the value of a first sort field, as determined from the sort sequence, of a previously inserted record does not match the value of the same field for the subsequent record, none of the markers determined when inserting the previous record may be used for the subsequent record.

Figure 6A:
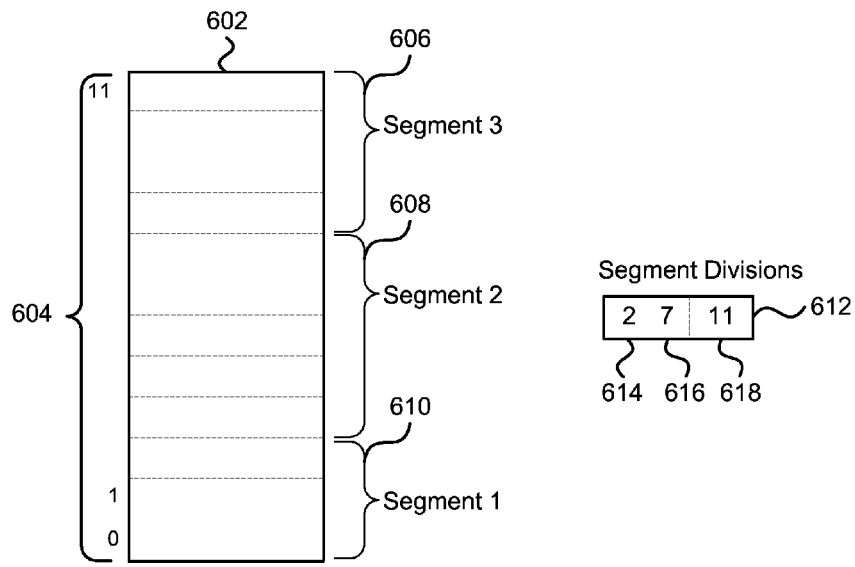
FIGS. 6A and 6B depict segmenting data records.
Figure 6B:
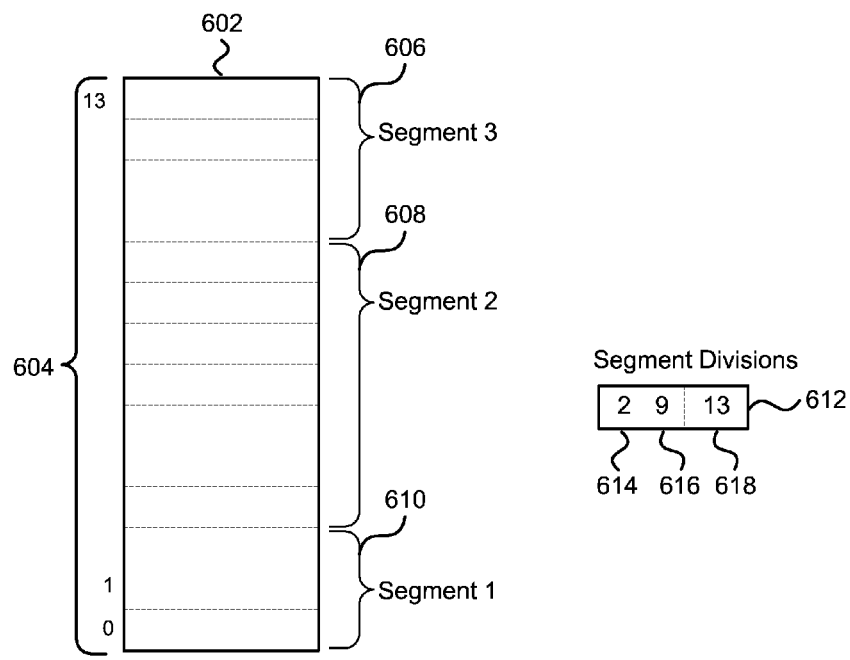

FIGS. 6A and 6B depict segmenting data records. The above has described slewing individual records and inserting new records. As described further below, the records can be grouped together into segments, which may make slewing and sorting records easier. The values of the records at the beginning and/or end of the segments can be used in order to quickly identify which segment a new record should be added to.

As depicted a file 602 may comprise a number of records 604 which are arranged into a number of segments 606, 608, 610. A segment division array 612 stores the record position of the last record in each segment. It is noted that the record position begins at 0. Accordingly, the first segment comprises records 0-2, the second segment comprises records 3-7 and the third segment comprises segments 8-11. When slewing the records, the entire segment can be slewed unless it is determined that a record to be added, or modified is within the particular segment. For example, if two new records are to be added into the second segment, the segments are slewed to the second segment and the records added. Once new records are added to a segment as depicted in FIG. 6B, the segment division array of the segment, as well as the higher segments are updated to reflect the new record positions of the segments.

Figure 7A:
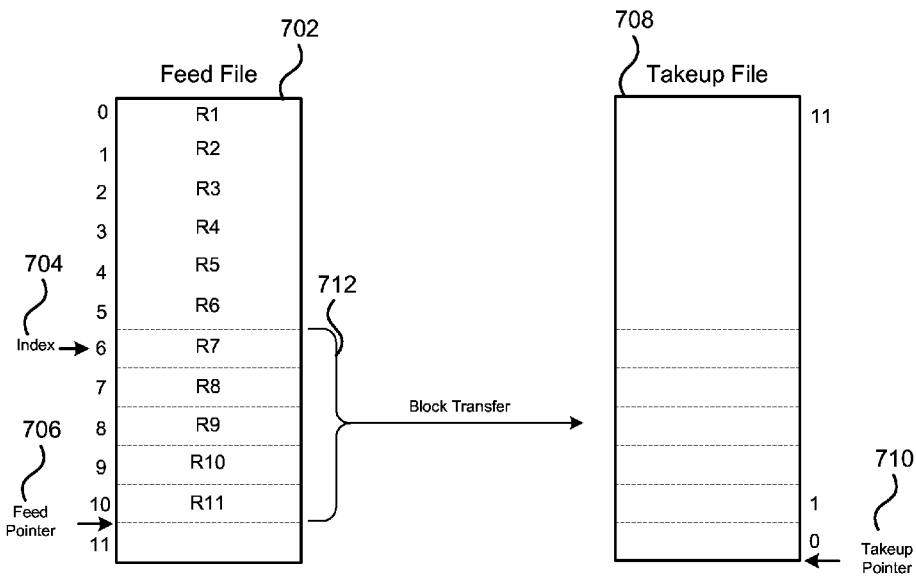
FIGS. 7A and 7B depict block transferring of records between files.
Figure 7B:
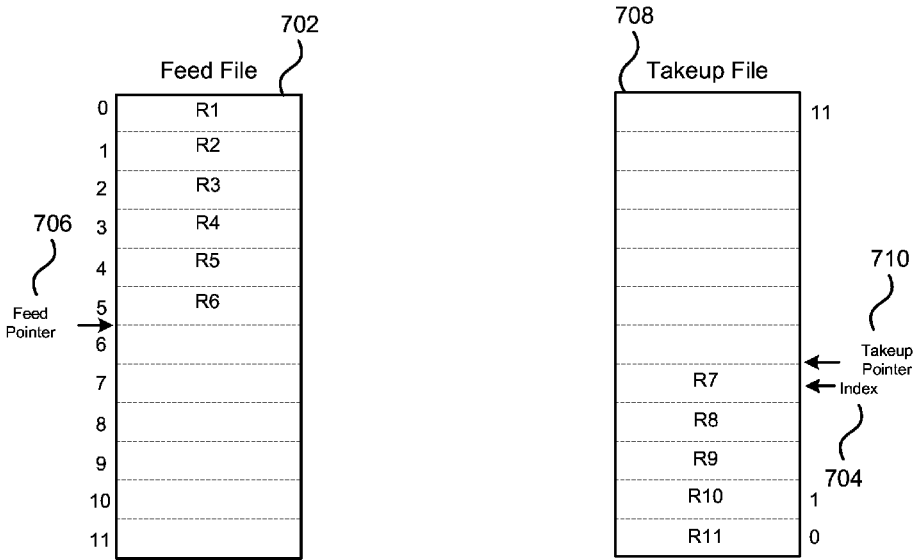
Figure 8:
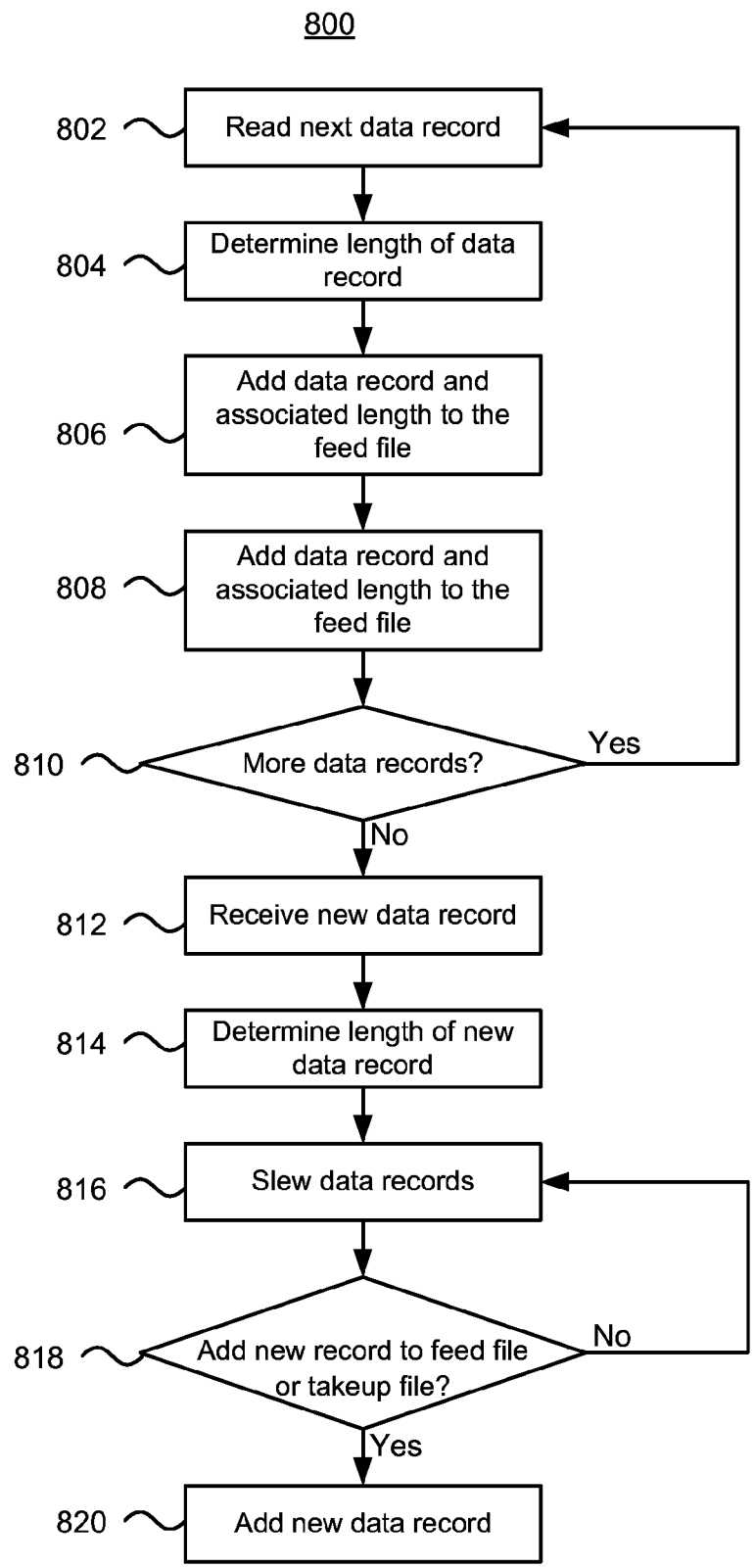
FIG. 8 depicts a method of manipulating records.

FIGS. 7A and 7B depict block transferring of records between files. As depicted in FIGS. 7A, 7B an index may be provided. The index may provide an indication of record number, byte address in the record file of the indexed record number, and a key word associated with the record, for example a primary field of the record. A respective index may be associated with each record in the feed and takeup files. If records are added, deleted or modified in addresses below higher indexes, the higher indexes have their byte addresses and record number modified in order to refer to the correct updated location in the respective file.

The feed files and the takeup file described above have written records in the same direction. It is possible that the feed file and the takeup file write records in opposite directions as depicted in FIGS. 7A and 7B. If the feed file 702 and takeup file 708 write records in opposite directions, it is possible to block transfer a number of records 712 directly from the feed file 702 to the takeup file 708. When copying records from the feed file 702 to the takeup file 708, records that are located between an index position 704, indicating a starting record for the block copy, and a feed pointer 706 are moved from the feed file to the takeup file 708 and the takeup pointer 710 and index 704 are updated to the top of the block of records that were copied as shown in FIG. 7B. Similarly, the feed pointer is updated to the end of the records remaining in the feed file 706. The block transfer of records can be advantageously used to transfer all of the records in a segment at once. Since the records in the feed and takeup file are written and read in opposite directions, it is necessary to have the byte length of the records to be located at the beginning and end of each record so that the records can be easily located in either the takeup file or the feed file.

Figure 9:
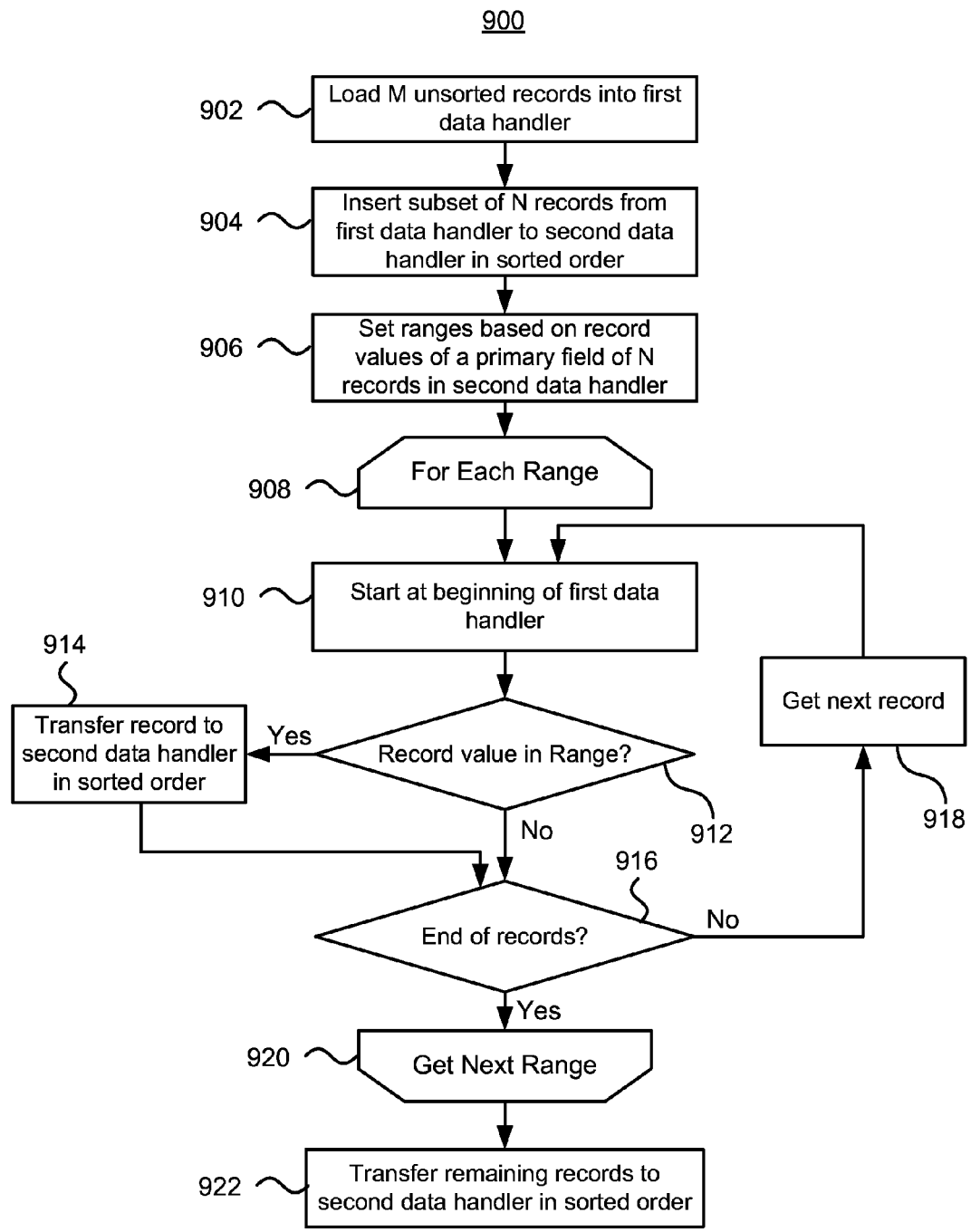
FIG. 9 depicts a method of sorting unsorted records.

FIG. 9 depicts a method of manipulating records. As described above, records can be added to a feed file or takeup file and the records slewed and manipulated. The manipulation may include adding, deleting or modifying records. The method 800 begins with reading a data record from an external source (802), such as a database. The byte length of the data record is determined (804) and the data record and the associated byte length is added to the feed file, or alternatively the takeup file (806). The byte length may be stored at the beginning and/or end of the record. The method determines if there are more records to add to the feed file, or alternatively the takeup file (810). If there are more data records (Yes at 810) the next data record is read (802). If there are no more records to load (No at 810) the method receives a new data record (812) and determines the byte-length of the new data record (814). The data records are slewed between the feed file and the takeup file (816) and it is determined if the new data record should be added to the takeup file or the feed file between the split records (818). If the record should not be added (No at 818) the data records are slewed again (816). If the record should be added (Yes at 818) the new data record is added to the feed file or the takeup file (820).

FIG. 9 depicts a method of sorting unsorted records. The method begins with load a number, M, of unsorted records into a first data handler (902). The records may be loaded into, for example, the feed file of the first data handler in an unsorted manner. The number of records added may vary; however, as an example, M may be equal to 1000. Once the M unsorted records are loaded into the first data handler, a subset of N records are transferred from the first data handler to a second data handler and inserted in a sorted manner (904). The number N of records moved from the first to the second data handler may be a percentage of the total records M, such as % 10 or a fixed number of records for example, 200 records. The records that are transferred may be taken off of the end of the file in the first data handler as if the records were being slewed to the other file. Since the records are unsorted, it is assumed for the purpose of explanation that the values of the N records are evenly distributed about the total values of the M records. Once the N records have been inserted into the second data handler, a number of ranges can be established based on the record values, and in particular the values of the primary field used in sorting all of the records (906). The ranges may be established have a fixed space between values, or the ranges may be established based on a desired number of ranges used to span all of the records. Regardless of how the ranges of the second data handler are established, each range is processed (908). For each range, the records in the first data handler, which will be in one of the feed or takeup files are processed starting at the beginning of the particular file the records are located in (910). The value of the current record is compared to determine if it is within the current range (912) and if it is, the record is moved from the first data handler an inserted into the second data handler within the first range in a sorted order (914). If the value is not in the current range (No at 912), or after the record has been transferred to the second record handler, it is determined if the end of the records have been reached (916). If there are more records (No at 916), the next record is processed (918) to determine if it is within the current range (910). If the end of the records has been reached (Yes at 916), the next range of the records in the second data handler is processed (920). As such, the records in the first data handler will be slewed back, and each record that falls within the current range will be inserted into the second data handler in a sorted order. Once all of the ranges have been processed, there may still be a number of records left in the first data handler which fall above or below the highest and lowest ranges. These records are transferred to the second data handler and inserted in a sorted order (922). As described above, the method 900 begins with all of the unsorted records in a first data handler and ends with all of the records located in the second data handler in a sorted order.

Although the above discloses example methods, apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skills in the art will readily appreciate that the examples provided are not the only way to implement such method and apparatus. For example, the methods may be implemented in one or more pieces of computer hardware, including processors and microprocessors, Application Specific Integrated Circuits (ASICs) or other hardware components.

The present disclosure has described various systems and methods with regard to one or more embodiments. However, it will be apparent to persons skilled in the art that a number of variations and modifications can be made without departing from the teachings of the present disclosure.

What is claimed is:

1. A method of manipulating data records comprising:
reading a plurality of data records from a record source, for each of the plurality of data records:
determining a length of the data record; and
adding the data record and associated length to a first file at a first position;
receiving a new data record to be added to the plurality of data records;
determining a length of the new data record;
slewing the data records between the first file and a second file until the new record should be added after a last feed record of the first file or before a last takeup record of the second file based on a comparison of values of the new data record and the data records being slewed between the first file and the second file, wherein slewing the data records comprises:
moving a data record from the first file to a transfer buffer;
comparing the new data record to the data record of the transfer buffer to determine if the new data record should be added between the record in the transfer buffer and the last record in the second file;
if the new data record should be added between the data record in the transfer buffer and the last record in the second file, adding the new transfer record to the second file; and
if the new data record should not be added between the data record in the transfer buffer and the last record in the second file, moving the data record from the transfer buffer to the second file and moving another data record from the first file to the transfer buffer; and
adding the new record and associated length to either the end of the first file or the second file.

2. The method of claim 1, wherein the record source is a database.

3. The method of claim 2, further comprising:
retrieving the plurality of data records from the database; and
storing the data records from the first file and second file to the database after the new data record has been added.

4. The method of claim 3, further comprising:
modifying contents of one or more data records.

5. The method of claim 4, wherein modifying contents of one or more data records comprises updating the associated length of the modified one or more data records.

6. The method of claim 1, wherein slewing the data records further comprises:
comparing a further new data record to be added to the data record of the transfer buffer to determine if the further new data record should be added between the record in the transfer buffer and the last record in the second file or between the record in the transfer buffer and the last record in the first file;
if the further new data record should be added between the data record in the transfer buffer and the last record in the second file, adding the further new transfer record to the second file;
if the further new data record should be added between the data record in the transfer buffer and the last record in the first file, adding the further new transfer record to the first file; and
if the further new data record should not be added between the data record in the transfer buffer and the last record in the second file or the last record in the first file:
determining a slew direction for slewing the data records between the first file and the second file based on where the further new data record should be added; and
slewing the data records between the first file and the second file in the determined slew direction.

7. The method of claim 6, wherein:
if the slew direction indicates slewing data records from the first file to the second file, the further new data record may be added to the second file; and
if the slew direction indicates slewing data records from the second file to the first file, the further new data record may be added to the first file.

8. The method of claim 7, where the determined slew direction indicates whether the data records should be slewed from the first file to the second file or from the second file to the first file.

9. The method of claim 1, wherein the associated length is stored at the end of the respective data record.

10. The method of claim 1, wherein the associated length is stored at the beginning of the respective data record.

11. The method of claim 1, wherein the associated length is stored at the beginning and at the end of the respective data record.

12. The method of claim 1, wherein each data record comprises a plurality of data fields.

13. The method of claim 12, further comprising using a sort sequence specifying an order of two or more of the plurality of data fields when determining where the new data record should be added between the plurality of data records.

14. The method of claim 13, wherein the sort sequence defines a sort order as ascending or descending for each of the two or more data fields.

15. The method of claim 1, wherein the data records are grouped into a plurality of segments.

16. The method of claim 15, further comprising:
slewing segments of data records between the first file and the second file.

17. A system for manipulating data records comprising:
a processor for executing instructions; and
a memory for storing instruction, which when executed by the processor configure the system to:
read a plurality of data records from a record source, and for each of the plurality of data records:
determine a length of the data record; and
add the data record and associated length to a first file at a first position;
receive new data record to be added to the plurality of data records;
determine a length of the new data record;
slew the data records between the first file and a second file until the new record should be added after a last feed record of the first file or before a last takeup record of the second file based on a comparison of values of the new data record and the data records being slewed between the first file and the second file, wherein slewing the data records comprises:
  moving a data record from the first file to a transfer buffer;
  comparing the new data record to the data record of the transfer buffer to determine if the new data record should be added between the record in the transfer buffer and the last record in the second file;
  if the new data record should be added between the data record in the transfer buffer and the last record in the second file, adding the new transfer record to the second file; and
  if the new data record should not be added between the data record in the transfer buffer and the last record in the second file, moving the data record from the transfer buffer to the second file and moving another data record from the first file to the transfer buffer; and
add the new record and associated length to either the end of the first file or the second file.

18. A non-transitory computer readable memory storing instruction, which when executed by a processor of a computing system configure the computing system to:
  read a plurality of data records from a record source, and for each of the plurality of data records:
    determine a length of the data record; and
    add the data record and associated length to a first file at a first position;
  receive a new data record to be added to the plurality of data records;
  determine a length of the new data record;
  slew the data records between the first file and a second file until the new record should be added after a last feed record of the first file or before a last takeup record of the second file based on a comparison of values of the new data record and the data records being slewed between the first file and the second file, wherein slewing the data records comprises:
    moving a data record from the first file to a transfer buffer;
    comparing the new data record to the data record of the transfer buffer to determine if the new data record should be added between the record in the transfer buffer and the last record in the second file;
    if the new data record should be added between the data record in the transfer buffer and the last record in the second file, adding the new transfer record to the second file; and
    if the new data record should not be added between the data record in the transfer buffer and the last record in the second file, moving the data record from the transfer buffer to the second file and moving another data record from the first file to the transfer buffer; and
  add the new record and associated length to either the end of the first file or the second file.

* * * * *